US011862916B2

(12) United States Patent
Sato

(10) Patent No.: US 11,862,916 B2
(45) Date of Patent: Jan. 2, 2024

(54) TERMINAL-EQUIPPED ELECTRIC WIRE

(71) Applicant: Yazaki Corporation, Tokyo (JP)

(72) Inventor: Kei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 99 days.

(21) Appl. No.: 17/695,794

(22) Filed: Mar. 15, 2022

(65) Prior Publication Data

US 2022/0311153 A1 Sep. 29, 2022

(30) Foreign Application Priority Data

Mar. 23, 2021 (JP) ................................ 2021-048010

(51) Int. Cl.
*H01R 4/18* (2006.01)

(52) U.S. Cl.
CPC .................................... *H01R 4/185* (2013.01)

(58) Field of Classification Search
CPC ...................................................... H01R 4/185
USPC .......................................................... 439/877
See application file for complete search history.

(56) References Cited

U.S. PATENT DOCUMENTS

2017/0317430 A1* 11/2017 Kawamura ............ H01R 4/185
2018/0375276 A1 12/2018 Onuma
2019/0074603 A1* 3/2019 Furuhata ................ H01R 4/185
2019/0074604 A1* 3/2019 Furuhata .................. H01R 4/18
2020/0335926 A1* 10/2020 Takeda ..................... H01R 4/70
2022/0115793 A1 4/2022 Kitamura et al.

FOREIGN PATENT DOCUMENTS

JP 2012028021 A * 2/2012
JP 2012059595 A * 3/2012
JP 2012059671 A * 3/2012
JP 2013152805 A * 8/2013
JP 5565223 B2 * 8/2014
JP 2014216288 A * 11/2014
JP 2017-204444 A 11/2017
JP 2017199602 A * 11/2017
JP 2018-6205 A 1/2018
JP 2018-37252 A 3/2018
JP 2018106863 A * 7/2018
JP 2019-9027 A 1/2019
JP 6468276 B2 * 2/2019
JP 2020191196 A * 11/2020 ............ H01R 11/11
WO 2020/166110 A1 8/2020

* cited by examiner

*Primary Examiner* — Peter G Leigh
(74) *Attorney, Agent, or Firm* — KENEALY VAIDYA LLP

(57) ABSTRACT

A terminal-equipped electric wire includes an electric wire, a terminal fitting, and a water seal member, which covers an exposed part of the electric wire in the terminal fitting. The terminal fitting includes a base wall, a pair of core-wire crimping sections, and a pair of sheath crimping sections. The base wall includes a recess extending continuously from an opposite arrangement area of the pair of sheath crimping sections offset from a rear end portion toward a distal end portion to an area beyond a distal tip surface of the distal end of a sheath end portion. The recess receives a side on the base wall of the sheath end portion from a crimped portion offset from the rear end portion toward the distal end portion in the pair of sheath crimping sections to the distal tip surface.

2 Claims, 4 Drawing Sheets

TERMINAL-EQUIPPED ELECTRIC WIRE

CROSS-REFERENCE TO RELATED APPLICATION(S)

The present application claims priority to and incorporates by reference the entire contents of Japanese Patent Application No. 2021-048010 filed in Japan on Mar. 23, 2021.

BACKGROUND OF THE INVENTION

1. Field of the Invention

The present invention relates to a terminal-equipped electric wire.

2. Description of the Related Art

Conventionally, there are terminal-equipped electric wires that have anticorrosion treatment applied to electric wires and crimping portions of terminal fittings crimped onto the electric wires. For example, Japanese Patent Application Laid-open No. 2018-006205 discloses a technique that covers an exposed part of the electric wire in the crimping portion with a water seal member made from a curable resin from the outside together with the crimping portion to suppress the entry of liquid into a connection portion between the electric wire and the crimping portion. Japanese Patent Application Laid-open No. 2017-204444 discloses a technique in which a distal end of a core-wire uncovered portion at an end of the electric wire projects from the crimping portion, and a narrow groove is formed in a base wall of the terminal fitting on which the distal end of the core-wire uncovered portion is placed so that water or other liquid is discharged through this narrow groove.

The conventional crimping portions described above are divided into a portion that is crimped onto the core-wire uncovered portion of the electric wire and a portion that is crimped onto the sheath end portion of the electric wire sheath in a side on the core-wire uncovered portion. As such, in the sheath end portion, a crimping force applied by the crimping portion for the sheath causes the distal end that is projected from the crimping portion to curl outward in directions opposite to the directions of the crimping force, for example. Since curable liquid resin is applied to the terminal-equipped electric wire with the distal end of the sheath end portion curling outward, the water seal member may be thinner than the surroundings on the curling part in the sheath end portion, or the water seal member may be absent on the curling part. For this reason, in the terminal-equipped electric wire, the water seal member may have reduced durability at the curling part in the sheath end portion.

SUMMARY OF THE INVENTION

It is an object of the present invention to provide a terminal-equipped electric wire that achieves anticorrosion performance with high durability.

In order to achieve the above mentioned object, a terminal-equipped electric wire according to one aspect of the present invention includes a terminal-equipped electric wire comprising: an electric wire including a core wire and a sheath, the core wire including a plurality of strands, the sheath covering the core wire while exposing a core-wire uncovered portion of the core wire; a terminal fitting attached to the electric wire; and a water seal member that is made from a curable resin material and covers an exposed part of the electric wire in the terminal fitting from an outside together with the terminal fitting to suppress entry of liquid into a connection portion between the electric wire and the terminal fitting, wherein the terminal fitting includes: a base wall on which the electric wire is placed; a pair of core-wire crimping sections that is raised from the base wall and crimped onto the core-wire uncovered portion together with the base wall; and a pair of sheath crimping sections that is raised from the base wall and crimped onto a sheath end portion of the sheath in a side on the core-wire uncovered portion together with the base wall with a distal end of the sheath end portion in the side on the core-wire uncovered portion projecting from a distal end portion, and the base wall includes a recess extending continuously from an opposite arrangement area of the pair of sheath crimping sections offset from a rear end portion toward the distal end portion to an area beyond a distal tip surface of the distal end of the sheath end portion, the recess receiving a side on the base wall of the sheath end portion from a crimped portion offset from the rear end portion toward the distal end portion in the pair of sheath crimping section to the distal tip surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
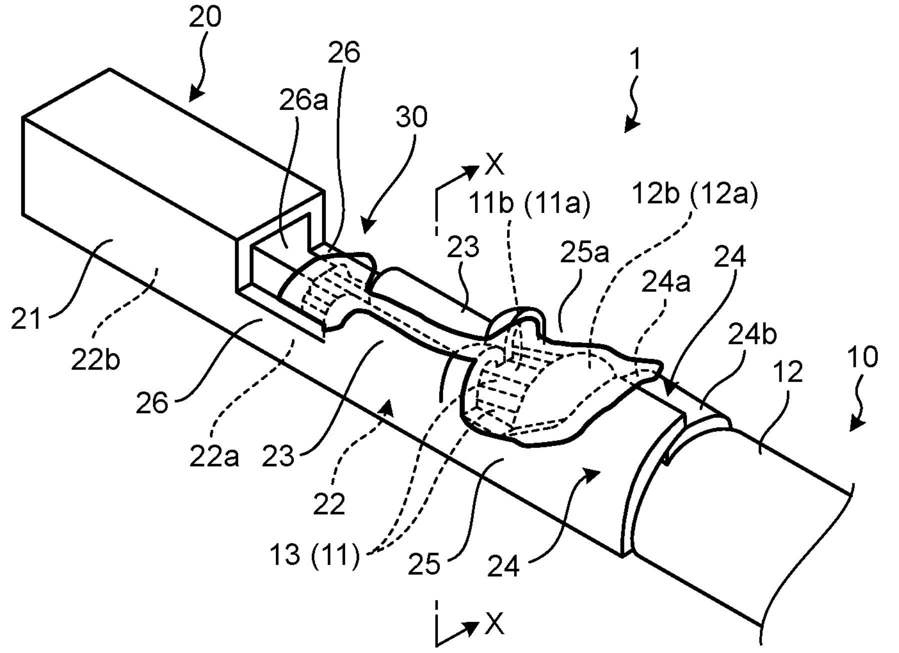
FIG. 1 is a perspective view illustrating a terminal-equipped electric wire according to an embodiment.

Referring to the drawings, an embodiment of a terminal-equipped electric wire according to the present invention is now described in detail, but the present invention is not limited to this embodiment.

Embodiment

One embodiment of a terminal-equipped electric wire according to the present invention is now described with reference to FIGS. 1 to 7.

Figure 2:
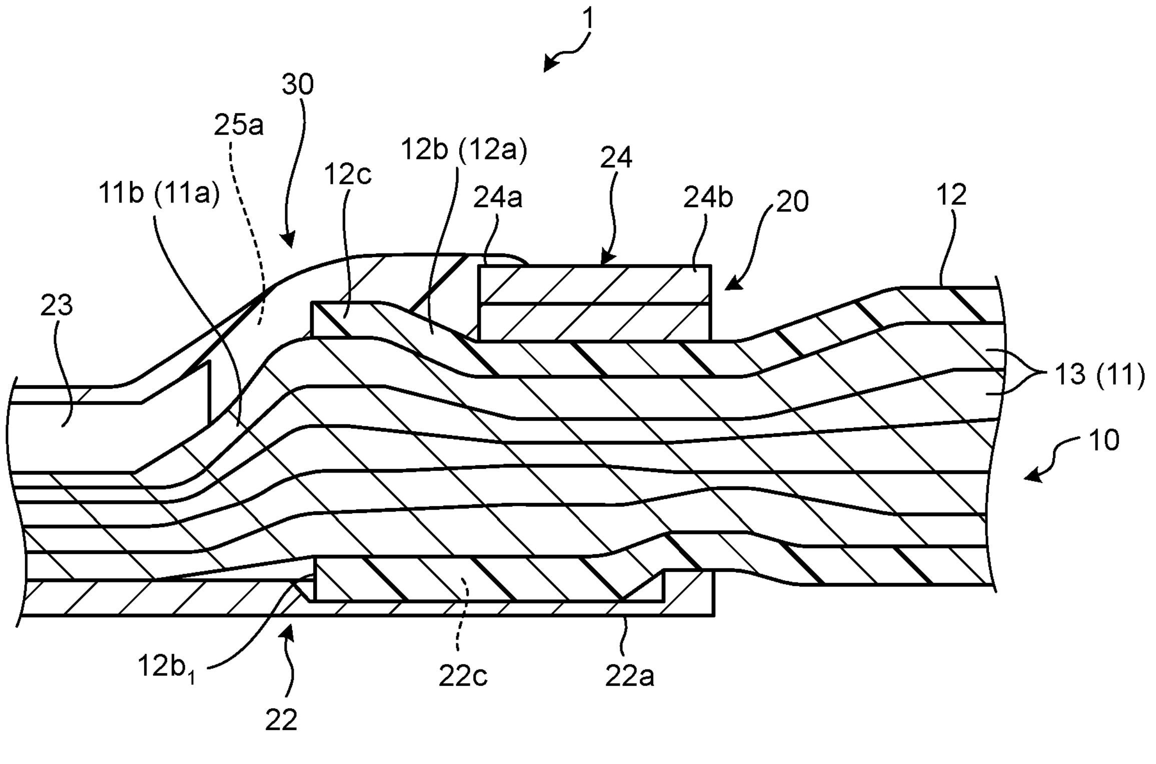
FIG. 2 is a partially enlarged view of a cross-section taken along line X-X in FIG. 1.

Reference numeral 1 in FIGS. 1 to 5 indicates the terminal-equipped electric wire according to the present embodiment. The terminal-equipped electric wire 1 includes an electric wire 10 and a terminal fitting 20, which are physically and electrically connected to each other. The terminal-equipped electric wire 1 also includes a water seal member 30 to enhance anticorrosion performance of a connection portion between the electric wire 10 and the terminal fitting 20 (FIGS. 1 and 2).

The terminal-equipped electric wire 1 may have the terminal fitting 20 connected to one end of the electric wire 10, or may have the terminal fitting 20 connected to a section between both ends of the electric wire 10. Furthermore, in the terminal-equipped electric wire 1, at least one terminal fitting 20 may be connected to one electric wire 10, or a plurality of electric wires 10 may be connected by at least one terminal fitting 20, and the electric wires 10 may be electrically connected via the terminal fitting 20. For example, when the terminal fitting 20 is formed to be physically and electrically connected to a counterpart terminal connector by fitting and connecting to the counterpart terminal connector of a counterpart terminal fitting, or to be physically and electrically connected to the counterpart terminal connector by fastening with a screw to the counterpart terminal connector, the terminal fitting 20 is connected to an end of at least one electric wire 10. In another example in which the terminal fitting 20 is formed as a joint terminal for electrically connecting a plurality of electric wires 10, the terminal fitting 20 is connected to an end of each electric wire 10 or a section between both ends of each electric wire 10. In this case, the terminal fitting 20 may be a joint terminal that is physically and electrically connected to a plurality of electric wires 10 to electrically connect all the electric wires 10 to one another via the terminal fitting 20. Alternatively, the terminal fitting 20 may be a joint terminal in which groups each combining at least two wires of the electric wires 10 are connected physically and electrically, and may be provided for each of the groups. The terminal-equipped electric wire 1 illustrated herein has a terminal fitting 20 connected to an end of one electric wire 10. This terminal fitting 20 is to be fitted and connected to a counterpart terminal connector (not illustrated).

The electric wire 10 includes a core wire 11 and a sheath 12 covering the core wire 11, and a part of the sheath 12 is peeled off so that the core wire 11 is partially uncovered (FIGS. 1 to 5). The core wire 11 is formed by bundling a plurality of strands 13 formed by conductive metal wires. The strands 13 is formed of aluminum, an aluminum alloy, copper, or a copper alloy, for example. The sheath 12 is formed of an insulating resin material, and covers the core wire 11 while exposing a core-wire uncovered portion 11*a* of the core wire 11. The electric wire 10 of the present embodiment has the core-wire uncovered portion 11*a* at its end.

The terminal fitting 20 is formed of a conductive material such as metal (for example, aluminum, an aluminum alloy, copper, or a copper alloy). The terminal fitting 20 is formed by shaping a metal plate as a base material into a predetermined shape by press work such as bending or cutting.

The terminal fitting 20 has a terminal connector 21, which is to be electrically connected to the counterpart terminal connector of a counterpart terminal fitting (FIGS. 1, 3, 4, and 6). For example, one of the terminal connector 21 and the counterpart terminal connector has a shape of a female terminal, and the other has a shape of a male terminal. The terminal connector 21 and the counterpart terminal connector are inserted and fitted to each other to be physically and electrically connected. In this example, the terminal connector 21 is shaped in the female terminal having the shape of a rectangular tube, while the counterpart terminal connector is shaped in the male terminal having the shape of a male tab.

The terminal fitting 20 has a base wall 22, on which the electric wire 10 is placed when the terminal-equipped electric wire 1 is assembled (FIGS. 1 to 6). The terminal fittings 20 includes a pair of core-wire crimping sections 23, 23, which is raised from the base wall 22 and crimped onto the core-wire uncovered portion 11*a* together with the base wall 22, and a pair of sheath crimping sections 24, 24, which is raised from the base wall 22 and crimped onto a sheath end portion 12*a* of the sheath 12 in a side on the core-wire uncovered portion 11*a* together with the base wall 22 with a distal end 12*b* of the sheath end portion 12*a* in the side on the core-wire uncovered portion 11*a* projecting from a distal end portion 24*a* (FIGS. 1 to 6). In the terminal fitting 20, the distal end of the core-wire uncovered portion 11*a* projects from the pair of core-wire crimping sections 23, 23, and the terminal connector 21 is located at the side corresponding to the distal end of the core-wire uncovered portion 11*a*. The terminal fitting 20 also includes a pair of side walls (hereinafter referred to as "first side walls") 25, 25 that is raised from the base wall 22 along the core-wire crimping sections 23, 23 and connects the sides of the core-wire crimping sections 23, 23 corresponding to the base wall 22 to the sides of the sheath crimping sections 24, 24 corresponding to the base wall 22. The first side walls 25, 25 are formed such that the distal end 12*b* of the sheath end portion 12*a* is exposed through an opening 25*a* defined between an edge of the pair of core-wire crimping sections 23, 23 and an edge of the pair of sheath crimping sections 24, 24 (FIGS. 1, 3, 4, and 6). The terminal fitting 20 further includes a pair of side walls (hereinafter referred to as "second side walls") 26, 26 that is raised from the base wall 22 along the core-wire crimping sections 23, 23 and connects the sides of the core-wire crimping sections 23, 23 corresponding to the base wall 22 to the terminal connector 21 (FIGS. 1, 3, 4, and 6).

The base wall 22 includes a first base portion 22*a* (FIGS. 1 to 6), from which the pair of core-wire crimping sections 23, 23, the pair of sheath crimping sections 24, 24, the pair of first side walls 25, 25, and the pair of second side walls 26, 26 are raised, and a second base portion 22*b* (FIGS. 1, 3, 4, and 6), which is a part of the wall portion of the terminal connector 21 and is continuous with the first base portion 22*a*. That is, the base wall 22 has the first base portion 22*a*, on which an end of the electric wire 10 is placed, and the second base portion 22*b*, which is a part of the wall portion of the terminal connector 21. For example, in the base wall 22, both of the first and second base portions 22*a* and 22*b* are formed in a flat or curved shape, or one of the first and second base portions 22*a* and 22*b* is formed in the flat shape, and the other in the curved shape. In the base wall 22 of this embodiment, the first and second base portions 22*a* and 22*b* are both formed in the flat shape.

Figure 3:
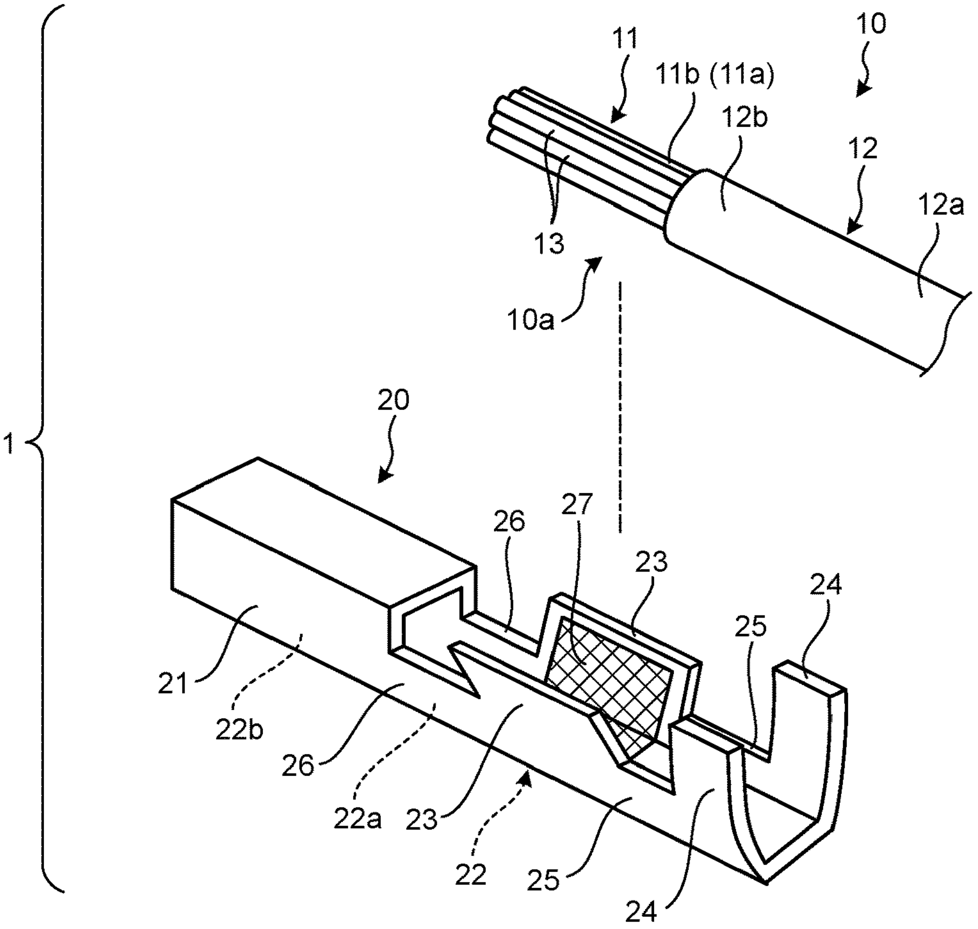
FIG. 3 is an exploded perspective view illustrating the terminal-equipped electric wire (excluding a water seal member) according to the embodiment.

The pair of core-wire crimping sections 23, 23 are sections projecting from both ends in a direction perpendicular to a axial direction of the electric wire 10 at the first base portion 22*a* of the base wall 22, on which the electric wire 10 is placed (FIGS. 1, 3, 4, and 6). In the terminal fitting 20, for example, the pair of core-wire crimping sections 23, 23 are projected in a direction intersecting the wall surface of the first base portion 22*a* and are arranged so as to face each other with a space in between, so that the first base portion 22*a* and the pair of core-wire crimping sections 23, 23 form a U shape (FIG. 3). In the terminal fitting 20, the core-wire uncovered portion 11*a* is placed on the first base portion 22*a*, which is the base of the U shape, and the pair of core-wire crimping sections 23, 23 are wound around the core-wire uncovered portion 11*a* and compressed to be crimped. As a result, the core-wire uncovered portion 11*a* is physically and electrically connected to the first base portion 22*a* and the pair of core-wire crimping sections 23, 23.

The pair of core-wire crimping sections 23, 23 is crimped onto the core-wire uncovered portion 11*a* together with the first base portion 22*a* of the base wall 22 with both ends of the core-wire uncovered portion 11*a* in the axial direction projecting from the core-wire crimping sections 23, 23. In the pair of core-wire crimping sections 23, 23 of the present embodiment, with being crimped onto the core-wire uncovered portion 11*a*, the distal end of the core-wire uncovered portion 11*a* corresponding to the pair of second side walls 26, 26 projects along the second side walls 26, 26, while a rear end 11*b* of the core-wire uncovered portion 11*a* corresponding to the pair of first side walls 25, 25 projects along the first side walls 25, 25 (FIGS. 1, 2, 4, and 5).

The terminal fitting 20 of the present embodiment includes, on its inner wall surface, a serration region 27 (FIGS. 3 and 6) including at least one of a plurality of recesses and a plurality of projections. The serration region 27 extends from one of the core-wire crimping sections 23 to the other core-wire crimping section 23. In the first base portion 22*a* and the pair of core-wire crimping sections 23, 23, the serration region 27 increases the contact surface with the core-wire uncovered portion 11*a*, thereby increasing the adhesion strength between these portions to improve contact reliability. The electrical connection between these portions is thus improved.

The pair of sheath crimping sections 24, 24 are sections projecting from both ends in a direction perpendicular to the axial direction of the electric wire 10 at the first base portion 22*a* of the base wall 22, on which the electric wire 10 is placed (FIGS. 1, 3, 4, and 6). In the terminal fitting 20, for example, the pair of sheath crimping sections 24, 24 are projected in a direction intersecting the wall surface of the first base portion 22*a* and are arranged so as to face each other with a space in between, so that the first base portion 22*a* and the pair of sheath crimping sections 24, 24 form a U shape (FIG. 3). In the terminal fitting 20, the sheath end portion 12*a* is placed on the first base portion 22*a*, which is the base of the U shape, and the pair of sheath crimping sections 24, 24 is wound around the sheath end portion 12*a* and compressed to be crimped.

Figure 4:
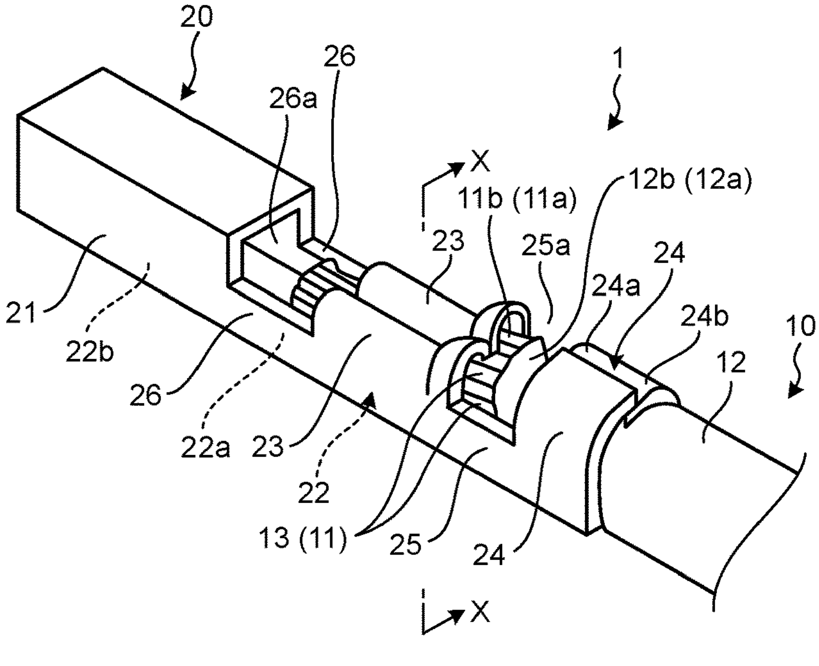
FIG. 4 is a perspective view illustrating the terminal-equipped electric wire (excluding the water seal member) according to the embodiment.

When the pair of sheath crimping sections 24, 24 is crimped onto the sheath end portion 12*a* together with the first base portion 22*a* of the base wall 22, the distal end 12*b* of the sheath end portion 12*a* projects from the distal end portion 24*a*, which corresponds to the pair of core-wire crimping sections 23, 23 toward the pair of first side walls 25, 25, and the electric wire 10 extends outward from a rear end portion 24*b*, which is opposite to the distal end portion 24*a* (FIGS. 1 and 4).

The pair of first side walls 25, 25 are sections projecting from both ends in a direction perpendicular to the axial direction of the electric wire 10 at the first base portion 22*a* of the base wall 22, on which the electric wire 10 is placed (FIGS. 1, 3, 4, and 6). The pair of first side walls 25, 25 are projected in a direction intersecting the wall surface of the first base portion 22*a* and are arranged so as to face each other with a space in between. In the pair of first side walls 25, 25, one of the first side walls 25 is connected to the side of one of the core-wire crimping sections 23 corresponding to the first base portion 22*a* and the side of one of the sheath crimping sections 24 corresponding to the first base portion 22*a*, while the other first side wall 25 is connected to the side of the other core-wire crimping section 23 corresponding to the first base portion 22*a* and the side of the other sheath crimping section 24 corresponding to the first base portion 22*a*.

In the terminal fitting 20, the opening 25*a* for exposing the distal end 12*b* of the sheath end portion 12*a* is defined between the ends of the pair of first side walls 25, 25 on a projecting direction and between the pair of core-wire crimping sections 23, 23 and the pair of sheath crimping sections 24, 24 (FIGS. 1, 2, 4, and 5). The opening 25*a* of the present embodiment exposes the distal end 12*b* of the sheath end portion 12*a* and the rear end 11*b* of the core-wire uncovered portion 11*a*.

The pair of second side walls 26, 26 are sections projecting from both ends in a direction perpendicular to the axial direction of the electric wire 10 at the first base portion 22*a* of the base wall 22, on which the electric wire 10 is placed (FIGS. 1, 3, 4, and 6). The pair of second side walls 26, 26 are projected in a direction intersecting the wall surface of the first base portion 22*a* and are arranged so as to face each other with a space in between. In the pair of the second side walls 26, 26, one of the second side walls 26 is connected to the terminal connector 21 and the side of one of the core-wire crimping sections 23 corresponding to the first base portion 22*a*, while the other second side wall 26 is connected to the terminal connector 21 and the side of the other core-wire crimping section 23 corresponding to the first base portion 22*a*.

In the terminal fitting 20, an opening 26*a* for exposing the distal end of the core-wire uncovered portion 11*a* is defined between the ends of the pair of second side walls 26, 26 on the projecting direction and between the terminal connector 21 and the pair of core-wire crimping sections 23, 23 (FIGS. 1 and 4).

The base wall 22 of the terminal fitting 20 includes a recess 22*c* (FIGS. 2, 5, and 6), which extends continuously from an opposite arrangement area of the pair of sheath crimping sections 24, 24 offset from the rear end portion 24*b* toward the distal end portion 24*a* to an area beyond the distal tip surface 12$b_1$ of the distal end 12*b* of the sheath end portion 12*a*. The recess 22*c* receives a side on the base wall 22 of the sheath end portion 12*a* from a crimped portion offset from the rear end portion 24*b* toward the distal end portion 24*a* in the pair of sheath crimping sections 24, 24 to the distal tip surface 12$b_1$. The recess 22*c* is formed in the first base portion 22*a*.

Figure 6:
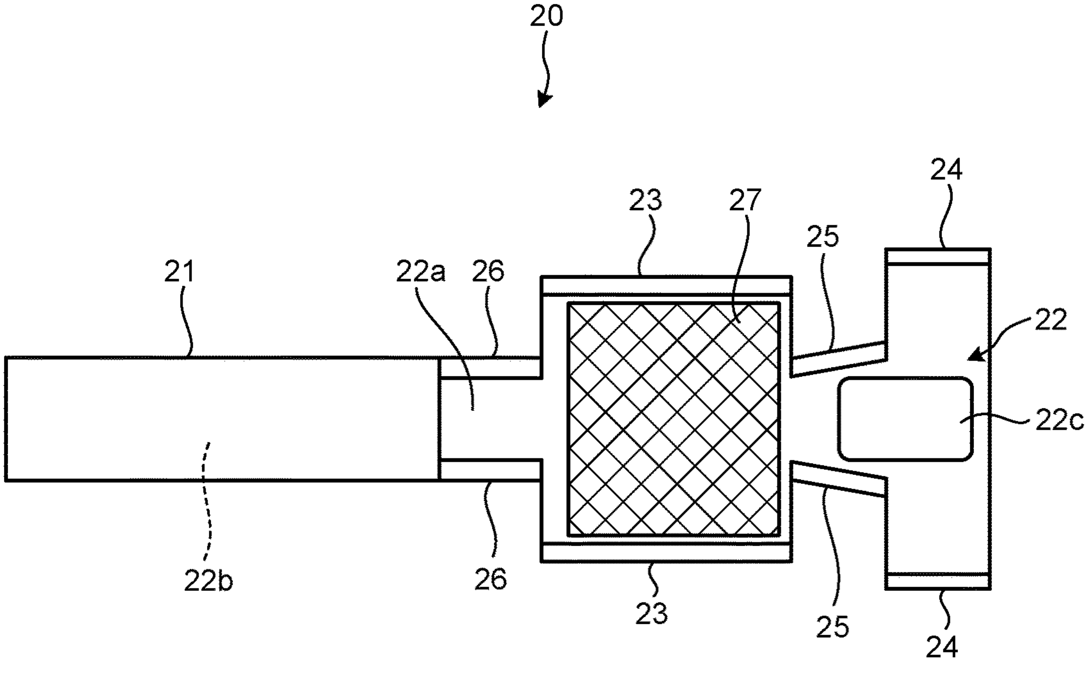
FIG. 6 is a plan view of a terminal fitting before an end of an electric wire is attached, as viewed from an inner wall surface side.

The recess 22*c* of the present embodiment is located in a recess formation region extending from the opposite arrangement area of the pair of sheath crimping sections 24, 24, excluding the rear end portion 24*b* and being offset toward the distal end portion 24*a*, to an area beyond the distal tip surface 12$b_1$ of the sheath end portion 12*a* in the inner wall surface of the first base portion 22*a*. The recess 22*c* is recessed in a rectangular shape from one of the first side walls 25 to the other first side wall 25 (FIG. 6).

Figure 5:
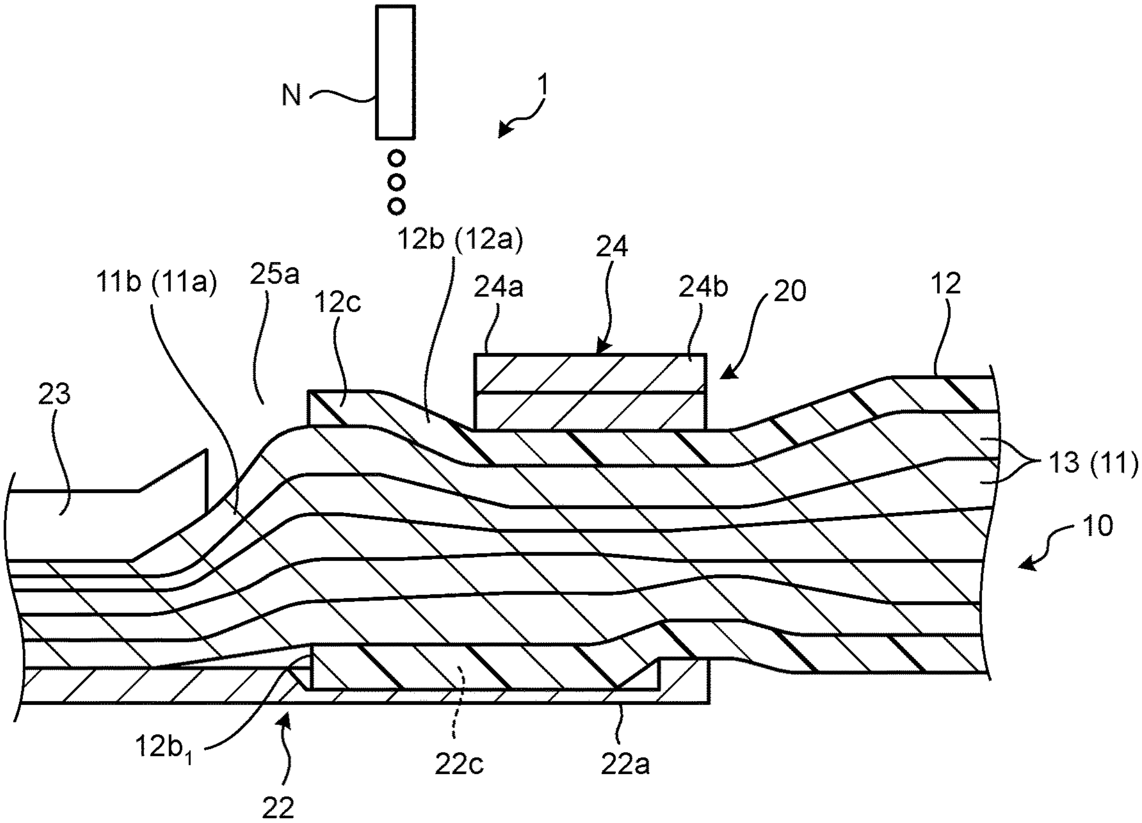
FIG. 5 is a partially enlarged view of a cross-section taken along line X-X in FIG. 4.

In the terminal-equipped electric wire 1, when the pair of sheath crimping sections 24, 24 is crimped onto the sheath end portion 12*a*, the crimping force applied by the pair of sheath crimping sections 24, 24 presses the sheath end portion 12*a* into the recess 22*c*. The recess 22*c* is formed to have a size such that a gap is formed between the distal tip surface 12$b_1$ and the surface defining the recess 22*c* in a state where the sheath end portion 12*a* is pressed inside so that the recess 22*c* extends continuously beyond the distal tip surface 12$b_1$ of the sheath end portion 12*a* (FIGS. 2 and 5).

In the terminal-equipped electric wire 1, the crimping force acts on the sheath end portion 12*a* from the pair of sheath crimping sections 24, 24 and the first base portion 22*a* of the base wall 22 after crimping. As a result, a force acts on the distal end 12*b* of the sheath end portion 12*a*, which is supported by the first base portion 22*a*, in the directions opposite to the directions of the crimping force from the pair of sheath crimping sections 24, 24. As such, the distal end 12*b* of the sheath end portion 12*a* curls outward in the directions of this opposite force. However, in the terminal-equipped electric wire 1, the recess 22*c* in the first base portion 22*a* receives the sheath end portion 12*a*, thereby suppressing the curling of the curling part 12*c* in the distal end 12*b* of the sheath end portion 12*a* to a small degree (FIGS. 2 and 5).

The recess 22*c* is preferably formed as a recess having a depth corresponding to the thickness of the sheath 12. This allows the recess 22*c* to reduce the load on the core-wire uncovered portion 11*a* extending beyond the distal tip surface $\mathbf{12}b_1$ of the sheath end portion 12*a*, while suppressing the curling of the curling part 12*c* in the distal end 12*b* of the sheath end portion 12*a* to a small degree.

The water seal member 30 covers the exposed part of the electric wire 10 in the terminal fitting 20 together with the terminal fitting 20 from the outside (FIG. 1). The water seal member 30 thus suppresses the entry of liquid into the connection portion between the electric wire 10 and the terminal fitting 20.

The water seal member 30 is made from a curable resin material and obtained by curing the curable liquid resin material with fluidity. After the electric wire 10 and the terminal fitting 20 are crimped together, the curable liquid resin material is applied from a nozzle N to the exposed part of the electric wire 10 and the surrounding area in the terminal fitting 20. The water seal member 30 is formed by curing this curable resin material (FIGS. 1, 2, 4, and 5). To cover the electric wires 10 exposed through the openings 25*a* and 26*a* (the distal end 12*b* of the sheath end portion 12*a* and the distal end and the rear end 11*b* of the core-wire uncovered portion 11*a*), the curable liquid resin material is applied to the openings 25*a* and 26*a*, the pair of core-wire crimping sections 23, 23, and the pair of sheath crimping sections 24, 24.

Figure 7:
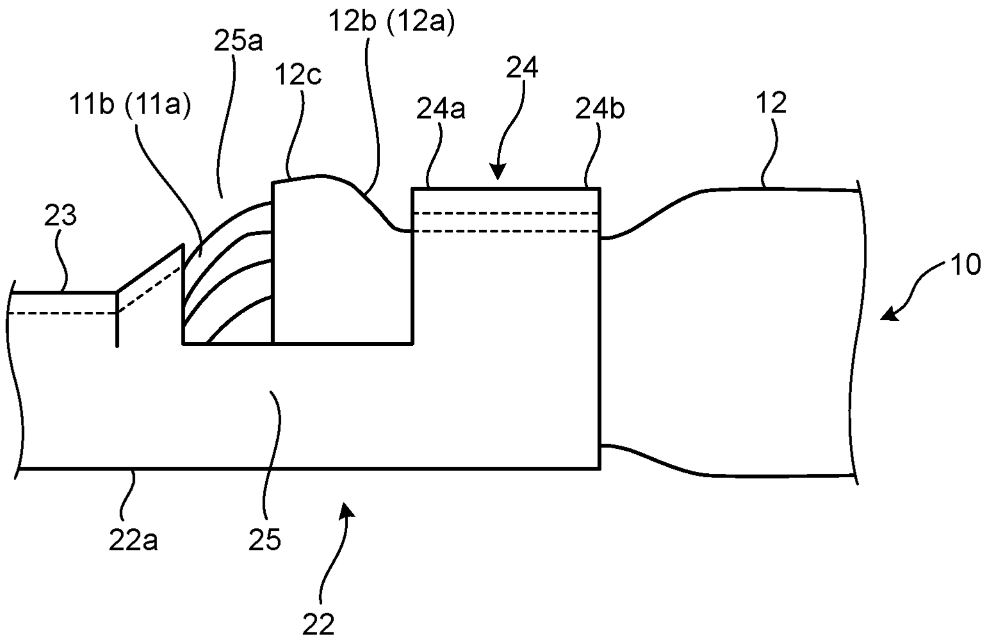
FIG. 7 is an explanatory diagram of a conventional terminal-equipped electric wire.

In the terminal-equipped electric wire 1, the curling of the curling part 12*c* in the distal end 12*b* of the sheath end portion 12*a* is suppressed to a small degree, as described above. Accordingly, as compared to a conventional configuration in which the curling of the distal end of the sheath end portion is not suppressed (FIG. 7), the terminal-equipped electric wire 1 allows the curable liquid resin material applied to the distal end 12*b* of the sheath end portion 12*a* through the opening 25*a* to remain on the distal end 12*b* of the sheath end portion 12*a* with its thickness maintained. The terminal-equipped electric wire 1 also allows the curable liquid resin material to be cured on the distal end 12*b* of the sheath end portion 12*a* with its thickness maintained (except for the shrinkage due to curing). Consequently, as compared to the water seal member of a conventional terminal-equipped electric wire, the cured water seal member 30 has a smaller difference in thickness between the section that covers the distal end 12*b* of the sheath end portion 12*a* and the other section. The entire water seal member 30 is therefore sufficiently thick. For example, this significantly reduces the factors of a decrease in durability, which would occur at the curling part in the distal end of the sheath end portion of a conventional water seal member due to the influence of atmospheric pressure variation. Accordingly, the terminal-equipped electric wire 1 of the present embodiment has improved durability of the water seal member 30 as compared with a conventional configuration, so that it is possible to obtain anticorrosion performance with high durability. For example, the terminal-equipped electric wire 1 is particularly useful when the core wire 11 and the terminal fitting 20 are made of metal materials with different ionization tendencies, such as when the strands 13 are made of aluminum or an aluminum alloy and the terminal fitting 20 is made of copper or a copper alloy, and effectively suppresses an occurrence of galvanic corrosion. In FIG. 7, for convenience of illustration, the same reference numerals as those of the terminal-equipped electric wire 1 of the present embodiment are used.

With a conventional terminal-equipped electric wire, to form a water seal member with a suitable thickness on the curling part in the distal end of the sheath end portion, some techniques need to be devised in applying a curable resin material, such as increasing the amount of the curable liquid resin material applied to the distal end of the sheath end portion. In contrast, with the terminal-equipped electric wire 1 of the present embodiment, by simply applying a constant amount of curable liquid resin material while moving the nozzle N at a fixed speed from the pair of sheath crimping sections 24, 24 to the opening 26*a*, for example, the water seal member 30 with a suitable thickness is formed with an insignificant difference between the section on the distal end 12*b* of the sheath end portion 12*a* and the other section. The terminal-equipped electric wire 1 thus simplifies the application process of the curable resin material.

Furthermore, since the terminal-equipped electric wire 1 of the present embodiment suppresses the curling of the curling part 12*c* in the distal end 12*b* of the sheath end portion 12*a* to a small degree as compared to a conventional configuration, it is easier to predict how the curable liquid resin material applied through the opening 25*a* flows and how the flowing ends. The terminal-equipped electric wire 1 thus simplifies the application process of the curable resin material also in this respect.

Moreover, since the terminal-equipped electric wire 1 of the present embodiment suppresses the curling of the curling part 12*c* in the distal end 12*b* of the sheath end portion 12*a* to a small degree, the load applied by the pair of sheath crimping sections 24, 24 to the distal end 12*b* of the sheath end portion 12*a* is reduced during and after crimping. Accordingly, the distal end 12*b* is more likely to resist any damage inflicted by the pair of sheath crimping sections 24, 24. The sheath 12 of the terminal-equipped electric wire 1 thus has improved durability at the distal end 12*b* of the sheath end portion 12*a*.

In addition, since the terminal-equipped electric wire 1 of the present embodiment suppresses the curling of the curling part 12*c* in the distal end 12*b* of the sheath end portion 12*a* to a small degree, the specified range of appropriate crimp height of the pair of sheath crimping sections 24, 24 and the base wall 22 after crimping can be increased.

In the terminal-equipped electric wire according to the present embodiment, a crimping force acts on the sheath end portion from the pair of sheath crimping sections and the base wall after crimping. As a result, a force acts on the distal end of the sheath end portion, which is supported by the base wall, in the directions opposite to the directions of the crimping force from the pair of sheath crimping sections. As such, the distal end of the sheath end portion curls outward in the directions of this opposite force. However, in this terminal-equipped electric wire, the recess in the base wall receives the sheath end portion, thereby suppressing the curling of the curling part in the distal end of the sheath end portion to a small degree. Accordingly, as compared to a conventional configuration in which the curling of the distal end of the sheath end portion is not suppressed, the terminal-equipped electric wire allows the curable liquid resin material applied to the distal end of the sheath end portion through an opening to remain on the distal end of the sheath end portion with its thickness maintained. The terminal-equipped electric wire also allows the curable liquid resin material to be cured on the distal end of the sheath end portion with its thickness maintained. Consequently, as compared to the water seal member of a conventional terminal-equipped electric wire, the cured water seal member has a smaller difference in thickness between the section that covers the distal end of the sheath end portion and the other section. For example, the entire water seal member is therefore sufficiently thick. This significantly reduces the factors of a decrease in durability, which would occur at the curling part in the distal end of the sheath end portion of a conventional water seal member due to the influence of atmospheric pressure variation. Accordingly, the terminal-equipped electric wire of the present embodiment has improved durability of a water seal member as compared with a conventional configuration, so that it is possible to obtain anticorrosion performance with high durability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal-equipped electric wire comprising:

an electric wire including a core wire and a sheath, the core wire including a plurality of strands, the sheath covering the core wire while exposing a core-wire uncovered portion of the core wire;

a terminal fitting attached to the electric wire; and a water seal member that is made from a curable resin material and covers an exposed part of the electric wire in the terminal fitting from an outside together with the terminal fitting to suppress entry of liquid into a connection portion between the electric wire and the terminal fitting, wherein the terminal fitting includes:

a base wall on which the electric wire is placed;

a pair of core-wire crimping sections that is raised from the base wall and crimped onto the core-wire uncovered portion together with the base wall; and a pair of sheath crimping sections that is raised from the base wall and crimped onto a sheath end portion of the sheath in a side on the core-wire uncovered portion together with the base wall with a distal end of the sheath end portion in the side on the core-wire uncovered portion projecting from a distal end portion of the sheath crimping sections, and the base wall includes a recess extending continuously from an opposite arrangement area of the pair of sheath crimping sections offset from a rear end portion of the sheath crimping sections toward the distal end portion to an area beyond a distal tip surface of the distal end of the sheath end portion, the recess receiving a side on the base wall of the sheath end portion from a crimped portion offset from the rear end portion toward the distal end portion in the pair of sheath crimping section to the distal tip surface, the recess includes a surface in the opposite arrangement area that faces the sheath crimping sections, and the side of the sheath end portion abuts the surface.

2. The terminal-equipped electric wire according to claim 1, wherein the terminal fitting has a terminal connector which is to be electrically connected to a counterpart terminal connector.

* * * * *